United States Patent
Tsuruta et al.

(10) Patent No.: US 7,093,951 B2
(45) Date of Patent: Aug. 22, 2006

(54) ELECTRICAL POWER TOOL WITH IMPROVED VISIBILITY IN DARKNESS

(75) Inventors: Masami Tsuruta, Toyota (JP);
Katsushi Miyashita, Anjo (JP)

(73) Assignee: Makita Corporation, Anjo (JP)

( * ) Notice: Subject to any disclaimer, the term of this patent is extended or adjusted under 35 U.S.C. 154(b) by 10 days.

(21) Appl. No.: 10/773,849

(22) Filed: Feb. 6, 2004

(65) Prior Publication Data

US 2004/0156190 A1 Aug. 12, 2004

(30) Foreign Application Priority Data

Feb. 7, 2003 (JP) ............................. 2003-031537

(51) Int. Cl.
*B25B 23/18* (2006.01)
*F21V 33/00* (2006.01)
(52) U.S. Cl. ........................ 362/119; 362/84; 362/120
(58) Field of Classification Search ................ 362/84, 362/109, 119, 120, 396; 250/462.1, 465.1, 250/466.1
See application file for complete search history.

(56) References Cited

U.S. PATENT DOCUMENTS 4,546,416 A * 10/1985 Pemberton ................... 362/84
4,896,253 A * 1/1990 Southworth .................. 362/109
6,502,949 B1 * 1/2003 Horiyama et al. ........... 362/119
2003/0177645 A1 * 9/2003 Flury et al. .................... 30/392

FOREIGN PATENT DOCUMENTS

| DE | 298 07 070 U1 | 6/1998 |
| JP | 2001-138269 | 5/2001 |
| JP | 2002-301669 | 10/2002 |

\* cited by examiner

*Primary Examiner*—Y. My Quach-Lee
(74) *Attorney, Agent, or Firm*—Lahive & Cockfield, LLP; Anthony A. Luarentano, Esq.

(57) ABSTRACT

A battery-operated electric power tool (1) includes a light unit (11) disposed on the front end of the main housing (2) and extending along the underside of the gear housing (6). The light unit (11) includes a light source (12) in a casing with the light emitting end of the light source (12) exposed through a hole at the front of the unit (11). The electric power tool (1) further includes at the front portion of the gear housing (6) a bumper (13) made of a molded rubber containing selfiuminous pigment. While the electric power tool (1) is operated with the light source (12) on, the bumper (13) absorbs and stores part of the light from the light source (12) and emits light therefrom, enabling the user to locate the bumper (13) in darkness or a dimly lit work environment even after sustained use in darkness.

3 Claims, 1 Drawing Sheet

ELECTRICAL POWER TOOL WITH IMPROVED VISIBILITY IN DARKNESS

RELATED APPLICATION(S)

Figure 1:
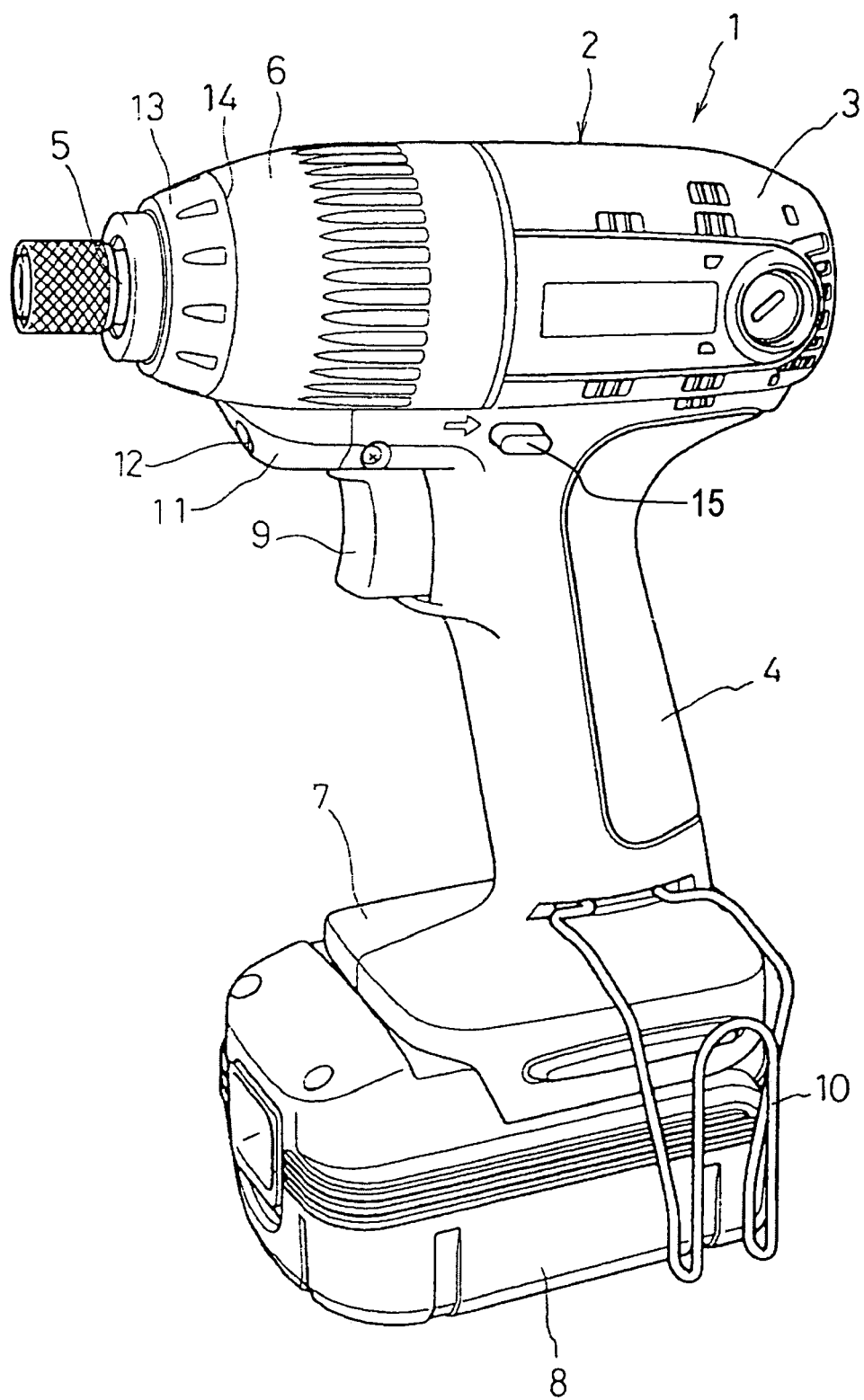

This application claims priority on Japanese Patent Application No. 2003-31537 filed on Feb. 7, 2003.

BACKGROUND OF THE INVENTION

1. Field of the Invention

The present invention generally relates to electric power tools. More particularly, the present invention relates to an electric power tool that includes a selfluminous component or part.

2. Description of the Related Art

A known electric power tool (Japan Published Unexamined Patent Application No. 2001-138269) utilizes a selfluminous component to enhance its visibility in dark or dimly lit environments in order to improve the usability of the device. In particular, this particular power tool bears on its housing a manufacturer's label coated with selfluminous paint or material or includes at least one component (such as the housing, the pistol grip handle, or the top portion of the tool where a tool bit is received) made of molded resin mixed with selfluminous pigment. The selfluminous paint or pigment emits a part or all of the ambient or environmental light that has been stored therein to facilitate the locating or finding of the electric tool in darkness.

While this arrangement achieves its intended objective, it is not free from certain problems and inconveniences. For example, these selfluminous materials emit increasingly less light with time. Accordingly, if it is left in a dark or dimly lit location for an extended period, the selfluminous material in the tool eventually stops emitting a sufficient amount of light to be visible.

SUMMARY OF THE INVENTION

In view of the above-identified problem, an important object of the present invention is to provide an electric power tool with at least one component that remains selfluminous after long-sustained use in the dark so as to ensure visibility of the tool.

The above object and other related objects are realized by the invention, which provides an electric power tool comprising a light source capable of emitting light, and at least one component at least part of which is selfluminous, wherein the component is capable of storing at least part of the light emitted from the light source and emitting light. According to the electric power tool, the selfluminous component stores light while the light source is switched on. This causes the component to emit light in the dark even after prolonged use and thus remain selfluminous and visible due to the light accumulation in the dark, and this allows the user to easily locate the power tool left, for example, on the floor of the work site. This convenient feature of the invention provides an electric power tool with improved usability.

According to one aspect of the present invention, the selfluminous component is disposed where the component is directly exposed to the light emitted from the light source. This selfluminous arrangement enables the component to store light reliably and efficiently.

According to another aspect of the present invention, the electric power tool further comprises a gear housing and a main housing which is coupled to a rear end of the gear housing. Additionally, the light source is disposed at a front end of the main housing on an underside of the gear housing, and the selfluminous component is an annular component mounted around a front end of the gear housing immediately forward of the light source. This enhances the visibility of the power tool itself as well as the components or parts that need to be operated, removed, attached, or otherwise frequently handled during use.

According to still another aspect of the present invention, the selfluminous component has an annular shape made of a rubber containing a selfluminous material.

According to yet another aspect of the present invention, the electric power tool further comprises an annular groove provided in the front end of the gear housing for removably receiving the annular selfluminous component.

According to one feature of the present invention, the selfluminous component is selected from a group consisting of components operated by a user, components to which other components of the tool are attached, and attachments to the power tool.

According to another feature of the present invention, the electric power tool further comprises an on/off trigger, a switch lever, a battery pack, a hook for hanging the power tool on a structure, and at least one bit. The selfluminous component is selected from the group consisting of the on/off trigger, the switch lever, the battery pack, the hook, and the at least one bit.

According to still another feature of the present invention, the component is provided with selfluminous characteristics by coating of at least one selfluminous material thereon.

According to yet another feature of the present invention, the component is provided with selfluminous characteristics by mixing of at least one selfluminous material therein during the manufacturing of the component.

In another preferred embodiment of the invention, the component provided with selfluminous characteristics is disposed on the part of the power tool irradiated by the light source. The foregoing arrangement enables the component to store light reliably and efficiently.

In one aspect, the selfluminous component is selected from a group consisting of components operated by a user, components to which other components of the tool are attached, and attachments to the power tool. This enhances the visibility of the tool itself as well as the components or parts that need to be operated, removed, attached, or otherwise frequently handled during use.

In another aspect, the electric power tool further comprises an on/off trigger, a switch lever, a battery pack, a hook for hanging the power tool on a structure, and at least one bit, wherein the selfluminous component is selected from the group consisting of the on/off trigger, the switch lever, the battery pack, the hook, and the at least one bit.

Other general and more specific objects of the invention will in part be obvious and will in part be evident from the drawings and descriptions which follow.

BRIEF DESCRIPTION OF THE ATTACHED DRAWING

For a fuller understanding of the nature and objects of the present invention, reference should be made to the following detailed description and the accompanying drawings, in which:

FIG. 1 is an overall perspective view of an electric power tool 1 in accordance with the present invention that operates on a rechargeable battery.

DETAILED DESCRIPTION OF THE PREFERRED EMBODIMENTS

Preferred embodiments of the present invention will be described hereinafter with reference to the attached drawings.

FIG. 1 is an overall perspective view of an electric power tool 1 in accordance with the present invention that operates on a rechargeable battery. The electric power tool 1 includes a main housing 2 made of synthetic resin and composed of left and right half casings. These half casings are fitted together to form a motor housing 3 that encases a motor (not shown) in the rear portion thereof and a pistol grip handle 4 that extends below from the motor housing 3 and encases a switch mechanism (not shown). In each half casing, the half motor housing 3 is integrally molded with the half grip pistol handle 4. Coupled to the front portion of the motor housing 3 is a metallic gear housing 6 that encases reduction gears and other components (not shown). Furthermore, a spindle 5 of the electric power tool 1 protrudes forward from the top portion of the metallic gear housing 6. The electric power tool 1 additionally includes at the bottom end of the grip handle 4 a battery pack coupling portion 7 to which is mounted a battery pack 8 containing a plurality of storage cells (not shown) that supplies electric power to the power tool 1. The battery-operated electric power tool 1 further includes an on/off trigger 9 that is impressed inward to operate the switch mechanism accommodated within the pistol grip handle 4 as well as a hook 10 provided at the bottom of the grip handle 4 that allows hanging of the tool 1 on a wall, the user's belt, or other suitable structure when it is unused.

A light unit 11 is disposed at the front end of the main housing 2, extending forward on the underside of the gear housing 6. The light unit 11 includes an encased light source 12, such as a light-emitting diode (LED), with the light emitting end of the light 12 exposed at the front of the light unit 11. As the light source 12 is electrically connected to the drive circuit of the motor, pulling in the on/off trigger 9 activates the motor and simultaneously switches on the light 12 to illuminate any objects located in front of the tool bit (not shown) coupled to the top end of the spindle 5.

Moreover, the electric power tool 1 includes an annular groove 14 provided in the front end of the gear housing 6 as well as a component with selfluminous characteristics or the property of emitting light, such as an annular bumper 13. The selfluminous bumper 13 is removably fitted in the groove 14 at the front end of the gear housing immediately forward of the light source 12. The bumper 13 is made of a rubber containing or mixed with selfluminous paint or pigment such that the bumper 13 is capable of storing and emitting ambient light from the entire surface thereof.

It should be noted that the electric power tool in accordance with the present invention is intended to incorporate components, including but not limited to tool bits and battery packs, that are to be removably attached to or otherwise used in combination with the main unit, which contains the motor.

In the operation of an electric power tool 1 thus constructed, when operated in a dark working environment, for example, in order to tightening screws, the light source 12 is switched on simultaneously with the activation of the motor, thus illuminating the location of work in progress and the objects generally in front of the tool bit. This allows a portion of the light to be absorbed and stored in the selfluminous bumper 13. Accordingly, even after the electric power tool 1 is used for a lengthy period in dark conditions, the bumper 13 remains selfluminous and thus visible when the work is interrupted or completed due to the light accumulation, ensuring positive visibility of the electric power tool 1 left, for example, on the floor of the work site. This convenient feature of the invention provides an electric power tool with an improved usability.

In this embodiment, the selfluminous component, i.e., the bumper 13, is disposed where it is directly exposed to the light emitted from the light source 12. In other words, the component provided with selfluminous characteristics is disposed on the part of the power tool irradiated by the light source. Accordingly, the component absorbs and stores light efficiently and reliably.

It should be noted that many components other than the bumper 13 may be provided with selfluminous characteristics or properties; for example, at least one of the motor housing 3, the gear housing 6, the light unit 11, the on/off trigger 9, the pistol grip handle 4, the side faces of the battery pack coupling portion 7, the hook 10, the housing of the battery pack 8, any detachable parts, such as tool bits, and other parts and components may be made selfluminous, for example, by impregnation, immixing, or coating of a suitable selfluminous paint, pigment, or material. If any particular component is made of synthetic resin, a luminous material may be mixed in during its molding process. Alternatively, a part of or the entire surface of a resin or metallic component may be given a selfluminous coating to attain the same effect. If a removable component, such as the bumper 13, is provided with selfluminous characteristics as in the foregoing embodiment, that component may be advantageously replaced with a new component when it is damaged or the coating is worn off.

It should be noted that the present invention may be applicable not only to electric power tools. as in the foregoing embodiment but also to power drills, driver-drills, impact torque wrenches, and other electric power tools, whether they are battery operated tools or AC (alternating current) tools. Accordingly, one or more components with selfluminous characteristics may be incorporated as in the foregoing embodiment in any such tool. In particularly preferred embodiments, components for manual operation, such as the on/off trigger 9 and switch lever 15, as well as components to be removably attached to the tool, such as the battery pack, hook, or bit of such a tool (where applicable) may be provided with selfluminous characteristics so as to enhance the visibility of the tool itself as well as specific components or parts which need to be operated, removed, attached, or otherwise handled during use in order to adjust, change, switch, control, and/or enable the operation of the tool.

Equivalents

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

Having described the invention, what is claimed as new and desired to be secured by Letters Patent is:

1. An electric power tool comprising
a gear housing,
a main housing which is coupled to a rear end of the gear housing, a light source capable of emitting light, wherein the light source is disposed at a front end of the main housing on an underside of the gear housing, at least one component of said electric power tool at least part of which is selfluminous, the component being capable of storing at least part of the light emitted from the light source and emitting light, wherein the selfluminous component is an annular component mounted around a front end of the gear housing and disposed where the component is directly exposed to the light emitted from the light source, and an annular groove provided in the front end of the gear housing for removably receiving the annular selfluminous component.

2. An electric power tool in accordance with claim 1, wherein the selfluminous component is disposed immediately forward of the light source.

3. An electric power tool in accordance with claim 1, wherein the selfluminous component is made of a rubber containing a selfluminous material.

* * * * *